(12) United States Patent
Veldez

(10) Patent No.: US 7,748,670 B1
(45) Date of Patent: Jul. 6, 2010

(54) TELEVISION ROTATIONAL SUPPORT APPARATUS

(76) Inventor: Steven C. Veldez, 670 Fulton Ave., Sacramento, CA (US) 95825

( * ) Notice: Subject to any disclaimer, the term of this patent is extended or adjusted under 35 U.S.C. 154(b) by 135 days.

(21) Appl. No.: 12/029,178

(22) Filed: Feb. 11, 2008

(51) Int. Cl.
*F16M 11/14* (2006.01)

(52) U.S. Cl. ............ 248/181.1; 248/181.2; 248/288.31; 248/917; 248/919; 248/923

(58) Field of Classification Search ............... 248/181.2, 248/181.1, 288.3, 288.11, 126, 917, 921, 248/919, 923
See application file for complete search history.

(56) References Cited

U.S. PATENT DOCUMENTS

| 4,203,636 | A | 5/1980 | Wells |
| 4,905,543 | A | 3/1990 | Choi |
| 6,095,476 | A | 8/2000 | Mathis |
| D440,863 | S | 4/2001 | Worrall |
| 6,484,993 | B2 | 11/2002 | Huffman |
| 6,601,811 | B1 | 8/2003 | Van Lieshout |
| 6,726,167 | B2 | 4/2004 | Oddsen, Jr. |
| 7,464,906 | B2 * | 12/2008 | Temperato et al. ........ 248/181.1 |
| 2004/0246236 | A1 | 12/2004 | Hildebrandt et al. |
| 2005/0110911 | A1 | 5/2005 | Childrey et al. |
| 2005/0199773 | A1 * | 9/2005 | Jung .......................... 248/404 |

* cited by examiner

*Primary Examiner*—Amy J Sterling
(74) *Attorney, Agent, or Firm*—Crossley Patent Law; Mark A. Crossley

(57) ABSTRACT

A television rotational support apparatus provides unlimited rotation of a removably mounted viewing screen, through a full 360 degree rotation. Pivot of the viewing screen mount provides for pivotal positioning of a viewing screen. The apparatus is compact with regard to size and with regard to distance between a mounting object and a viewing screen. The relatively short distance between mounting object and removably mounted viewing screen insures that minimal leverage force is imposed on the mounting object. Components of the apparatus such as the motor, gears, and battery/receiver provide for removal for replacement or service. A remote control provides for remotely rotating the viewing screen mount and hence the viewing screen.

18 Claims, 3 Drawing Sheets

TELEVISION ROTATIONAL SUPPORT APPARATUS

BACKGROUND OF THE INVENTION

Television support devices used in supporting a television or like monitor from a stand or wall mount are common in prior art. Such devices are often L-shaped, with the vertical leg of the L being the wall mount and the horizontal leg of the L being the television support. Any of such devices place a large amount of stress on the device and on the surface or structure to which the device is mounted, by virtue of the horizontal leg and the leg's needed length, especially considering that the longer the leg, or horizontal member of the L, the greater the force. For that reason alone, such devices are not always favorable in supporting a viewing screen. Still other devices exist in the prior art which are designed only to support flat screens, and therefore cannot be used with viewing screens of depth greater than that of flat screens. No device exists which provides for a viewing screen to be rotated about a horizontal axis up to and exceeding 90 degrees of rotation.

Also, many prior art devices exist which are highly complex, and therefore subject to failure and to expensive production and sales costs. The current apparatus provides a basic, sturdy, inexpensively produced apparatus for directly supporting a viewing screen, without an L-shape, and for remotely rotating the screen about the horizontal axis without rotational limitation, as well as providing pivotal adjustment.

FIELD OF THE INVENTION

The television rotational support apparatus relates to improvements in mounting television and like viewing screens and more specifically to a remotely controlled rotational support apparatus with pivot capability.

SUMMARY OF THE INVENTION

The general purpose of the television rotational support apparatus, described subsequently in greater detail, is to provide a television rotational support apparatus which has many novel features that result in an improved television rotational support apparatus which is not anticipated, rendered obvious, suggested, or even implied by prior art, either alone or in combination thereof.

To attain this, the television rotational support apparatus provides unlimited rotation of a viewing screen, through a full 360 degree rotation. Pivot of the viewing screen mount provides for pivotal positioning of a viewing screen also. The apparatus is compact with regard to size and with regard to distance between a mounting object and a removably affixed viewing screen. The relatively short distance between mounting object and removably mounted viewing screen is key and insures that minimal leverage force is imposed on the mounting object, unlike L-shaped mounts which lever viewing screen weight with extended arm supports. Components of the apparatus such as the motor, gears, and battery/receiver provide for removal for replacement or service. A remote control provides for remotely rotating the viewing screen mount, which removably receives a viewing screen.

Thus has been broadly outlined the more important features of the improved television rotational support apparatus so that the detailed description thereof that follows may be better understood and in order that the present contribution to the art may be better appreciated.

An object of the television rotational support apparatus is to provide unrestricted range of rotation around the horizontal axis.

Another object of the television rotational support apparatus is to provide pivotal movement of the mounted viewing screen.

A further object of the television rotational support apparatus is to be gear driven in rotation.

An added object of the television rotational support apparatus is to be sturdy.

And, an object of the television rotational support apparatus is to be basic.

Yet another object of the television rotational support apparatus is to be remotely controlled.

Still another object of the television rotational support apparatus is to provide bearinged rotational movement.

And, an object of the television rotational support apparatus is to reduce mounting surface and mounting object stress.

Further, an object of the television rotational support apparatus is to hold leverage of viewing screen weight to the apparatus to a minimum.

These together with additional objects, features and advantages of the improved television rotational support apparatus will be readily apparent to those of ordinary skill in the art upon reading the following detailed description of presently preferred, but nonetheless illustrative, embodiments of the improved television rotational support apparatus when taken in conjunction with the accompanying drawings.

In this respect, before explaining the current embodiments of the improved television rotational support apparatus in detail, it is to be understood that the television rotational support apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved television rotational support apparatus.

It is therefore important that the claims be regarded as including such equivalent constructions insofar as they do not depart from the spirit and scope of the television rotational support apparatus. It is also to be understood that the phraseology and terminology employed herein are for purposes of description and should not be regarded as limiting.

DETAILED DESCRIPTION OF THE DRAWINGS

Figure 1:
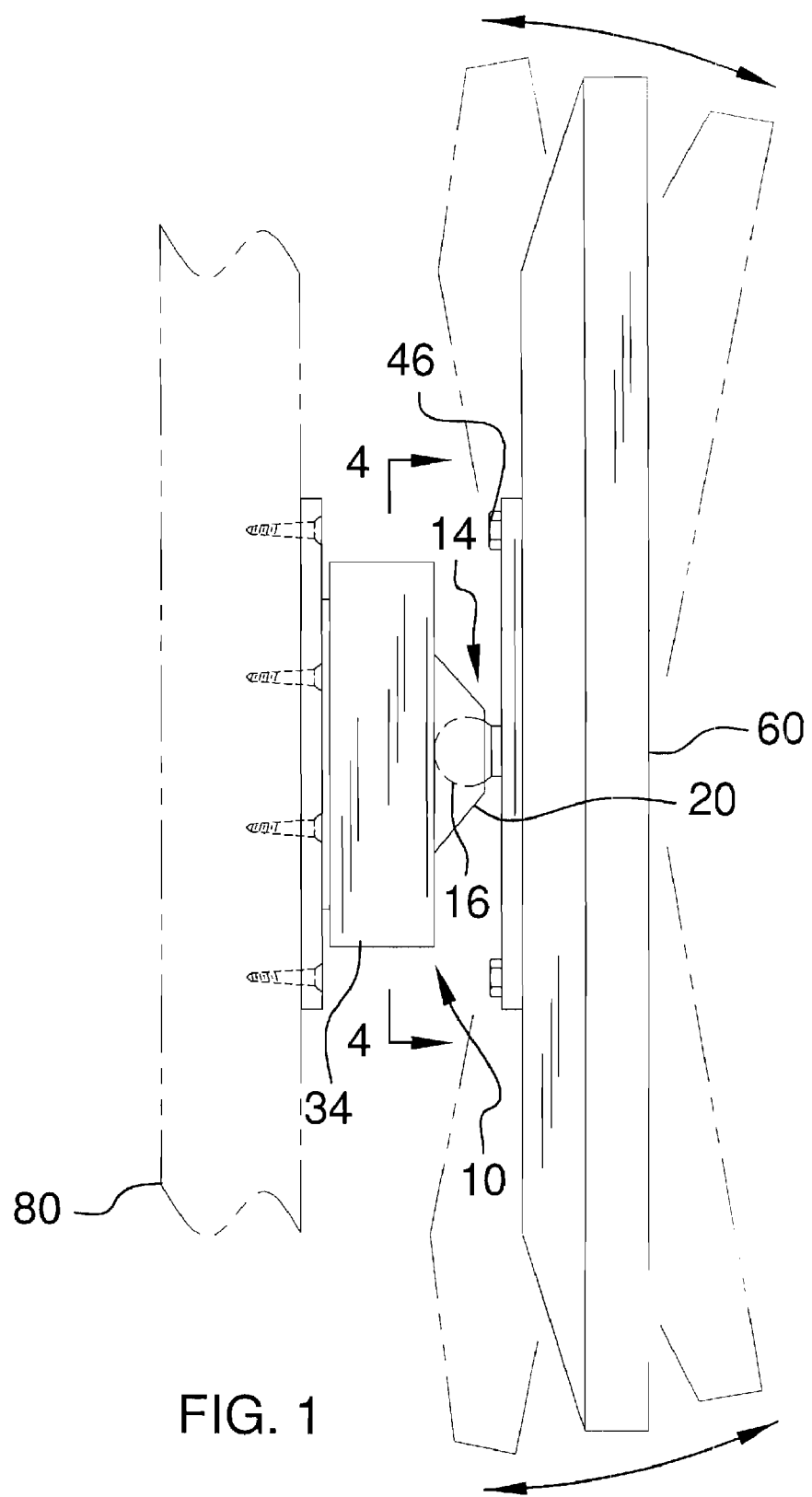
FIG. 1 is a top plan view of the apparatus fitted to a viewing screen and a mounting object.
Figure 2:
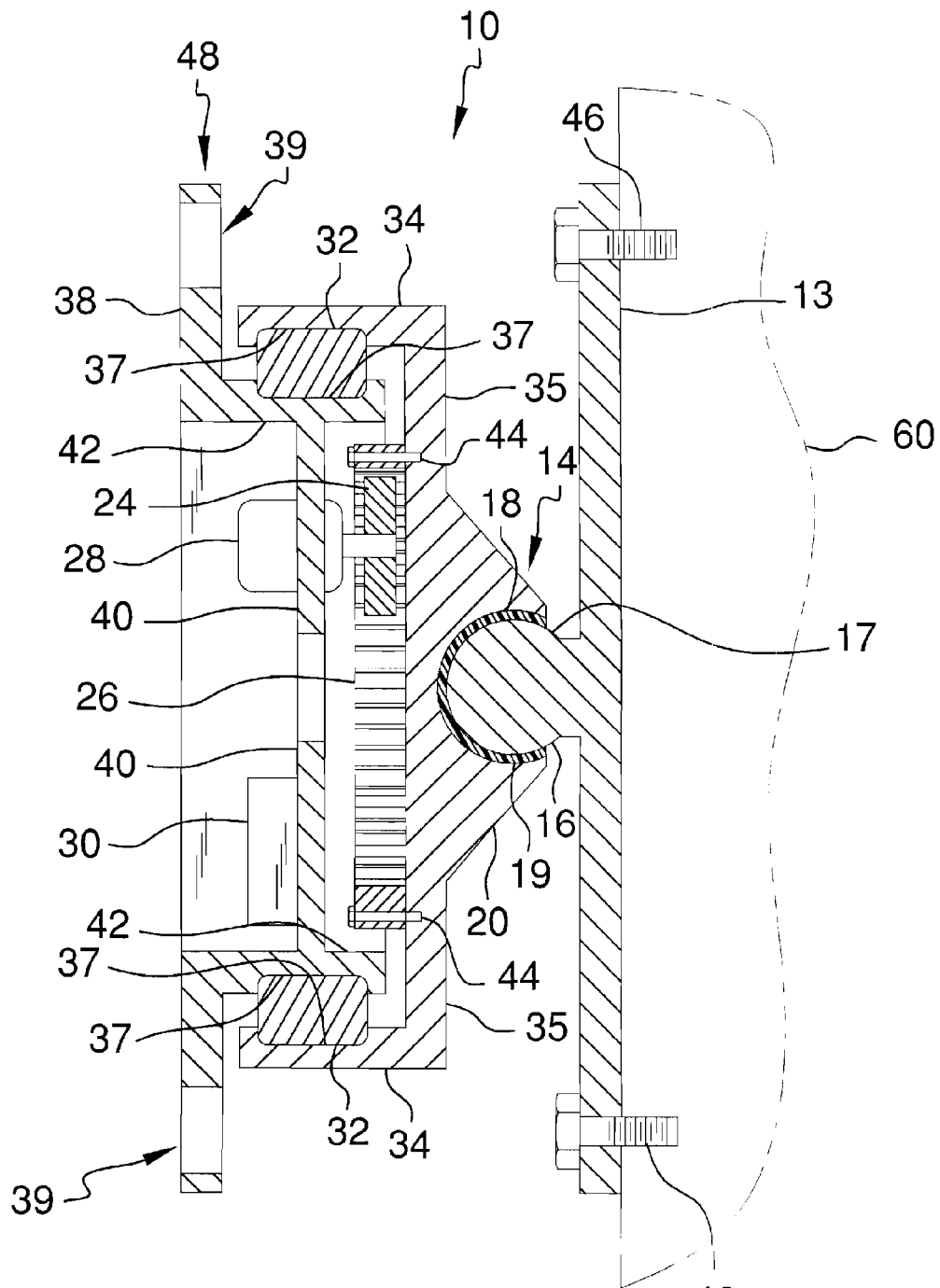
FIG. 2 is a partial cross sectional view of FIG. 1.
Figure 3:
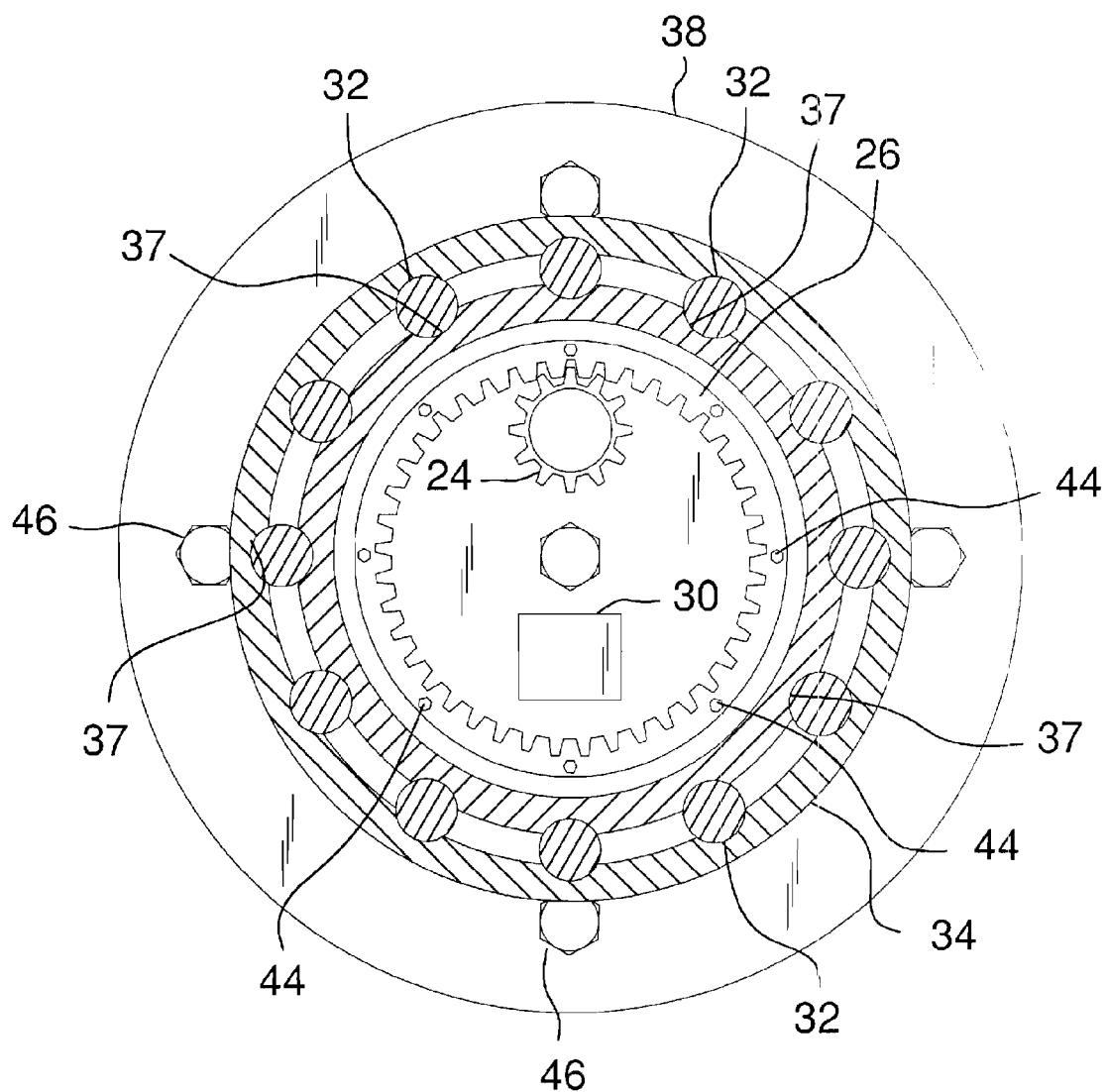
FIG. 3 is a partial cross sectional view, taken from the front of the apparatus.

With reference now to the drawings, and in particular FIGS. 1 through 3 thereof, the principles and concepts of the television rotational support apparatus generally designated by the reference number 10 will be described.

Referring to FIGS. 1, 2, and 3, the rotational support apparatus 10 is for use with a viewing screen 60 such as a television, computer monitor, movie screen, or the like. The apparatus 10 partially comprises a circular wall mount plate 38 on the inner end of the apparatus 10 with a plurality of spaced apart mount orifices 39. Various fasteners available to in the market can be used in insertion through the orifices 39 and further into a mounting object 80 such as a wall or other supporting structure. The circular inner horizontal 42 is seamlessly affixed to the wall mount plate 38. A bearing race 37 is disposed within the outer surface of the inner horizontal 42. The inner support 40 is seamlessly affixed to the inner horizontal 42. The inner support 40 is proximal to a midpoint of the inner horizontal 42. The inner support 40 thereby provides for maximal support of the inner horizontal 42. The inner support 40 is further disposed opposite an approximate midpoint of the inner horizontal bearing race 37 for proper support of the race 37. Ideally, the wall mount plate 38, inner horizontal 42, and inner support 40 are cast, molded, or forged from the same piece of material. The drive motor 28 is removably affixed to the inner support 40 in order that service and replacement are possible if needed. The drive gear 24 is vertically disposed on the drive motor 28. The battery/receiver 30 combination is removably affixed to the inner support, for the same servicing reasons. The apparatus 10 further comprises the circular encasement 34 which has an inner diameter greater than the outer surface diameter of the inner horizontal 42. A bearing race 37 is disposed within the inner diameter of the circular encasement 34. The plurality of roller bearings 32 is disposed within the inner horizontal 42 bearing race 37 and the circular encasement 34 bearing race 37. The circular vertical member 35 is perpendicularly and seamlessly affixed to outer end of the circular encasement 34. The rotation gear 26 is removably and vertically affixed to the circular member via removable anchors 44. The rotation gear 26 is in direct communication with the drive gear 24.

The conical extrusion 17 seamlessly emanates from the vertical member 35. The extrusion 17 has an outer surface at an at least 20 degree angle from the vertical member 35. The extrusion 17 performs more than one function. The extrusion occupies a large area of the vertical member 35 for strength in supporting the weight of a given viewing screen 60. The extrusion 17 angle allows for greater pivot capability of the socket ball 16 and hence viewing screen mount 13. Ideally, the circular encasement 34, the vertical member 35, and the extrusion 20 are formed from the same mold, casting, or forging. The socket 18 is disposed within about the center of the extrusion 20. The pivot ball 16 is fitted within the socket 18 and is surrounded by pivot material 19. The pivot material 19 can be comprised of various materials including plastics, other synthetics, and natural materials. The pivot material 19 substantially resists pivot of the pivot ball 16 such that manual effort is required to pivot the viewing screen mount 13. Manual placement of the viewing screen 60 is thereby established and held until a user alters that placement. The extension 17 is brief in order to reduce forces imposed by a viewing screen 80. The viewing screen mount 13 is perpendicularly and seamlessly affixed to the extension 17. Fasteners 46 or others known in the art and applicable to various viewing screens 80 are used to fasten the viewing screen 80 to the viewing screen mount 13. The relatively short distance from the viewing screen 60 and the wall mount plate 38 provides for as little force as is possible on the mounting object 80, especially as compared to other devices in the art.

A remote control (not shown) typical in the arts is used to transmit to the battery/receiver 30 in order to activate the drive motor 28 as desired by a user. Thus the user can affect rotation of the viewing screen mount 13 in the vertical plane. As example, a user in full recline on a couch or the like can rotate the viewing screen 60 affixed to the viewing screen 80 mount to a 90 degree from vertical position, thereby enabling visual focus on a picture without having to turn their head. There is no limitation to rotation of the viewing screen mount 13.

With respect to the above description then, it is to be realized that the optimum dimensional relationships for the parts of the television rotational support apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the television rotational support apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the television rotational support apparatus may be used.

Therefore, the foregoing is considered as illustrative only of the principles of the television rotational support apparatus. Further, since numerous modifications and changes will readily occur to those skilled in the art, it is not desired to limit the television rotational support apparatus to the exact construction and operation shown and described, and accordingly, all suitable modifications and equivalents may be resorted to, falling within the scope of the television rotational support apparatus.

What is claimed is:

1. A rotational support apparatus for use with a viewing screen, the apparatus comprising, in combination:
    a circular wall mount plate with a plurality of spaced apart mount orifices;
    a circular inner horizontal seamlessly affixed to the wall mount plate;
    a bearing race within an outer surface of the inner horizontal;
    an inner support seamlessly affixed to the inner horizontal, the inner support disposed opposite an approximate midpoint of the inner horizontal bearing race;
    a power supply affixed to the inner support;
    a drive motor removably affixed to the inner support, the drive motor in communication with the power supply;
    a vertically disposed drive gear affixed to the drive motor;
    a circular encasement having an inner diameter greater than the outer surface of the inner horizontal;
    a bearing race disposed within the inner diameter of the circular encasement;
    a plurality of roller bearings disposed within the inner horizontal bearing race and the circular encasement bearing race;
    a circular vertical member perpendicularly and seamlessly affixed to outer end of the circular encasement;
    a rotation gear vertically affixed to the circular member, the rotation gear in communication with the drive gear;
    a viewing screen mount perpendicularly and seamlessly affixed to the vertical member;
    means for controlling the power supply.

2. The apparatus according to claim 1 further comprising the inner support affixed proximal to a midpoint of the inner horizontal.

3. The apparatus according to claim 1 wherein rotation gear is removably affixed to the circular member.

4. The apparatus according to claim 2 wherein rotation gear is removably affixed to the circular member.

5. The apparatus according to claim 1 wherein the means for controlling the power supply further comprises a receiver affixed to the power supply;
    a remote control in communication with the receiver.

6. The apparatus according to claim 2 wherein the means for controlling the power supply further comprises a receiver affixed to the power supply;
a remote control in communication with the receiver.

7. The apparatus according to claim 3 wherein the means for controlling the power supply further comprises a receiver affixed to the power supply;
a remote control in communication with the receiver.

8. The apparatus according to claim 4 wherein the means for controlling the power supply further comprises a receiver affixed to the power supply;
a remote control in communication with the receiver.

9. A rotational support apparatus for use with a viewing screen, the apparatus comprising, in combination:
a circular wall mount plate with a plurality of spaced apart mount orifices;
a circular inner horizontal seamlessly affixed to the wall mount plate;
a bearing race within an outer surface of the inner horizontal;
an inner support seamlessly affixed to the inner horizontal;
a power supply affixed to the inner support;
a drive motor removably affixed to the inner support, the drive motor in communication with the power supply;
a vertically disposed drive gear affixed to the drive motor;
a circular encasement having an inner diameter greater than the outer surface of the inner horizontal;
a bearing race disposed within the inner diameter of the circular encasement;
a plurality of roller bearings disposed within the inner horizontal bearing race and the circular encasement bearing race;
a circular vertical member perpendicularly and seamlessly affixed to outer end of the circular encasement;
a rotation gear vertically affixed to the circular member, the rotation gear in communication with the drive gear;
an extrusion seamlessly emanating from the vertical member;
a socket within a center of the extrusion;
a pivot ball fitted within the socket;
a pivot material disposed between the pivot ball and the socket, whereby pivot of the pivot ball is substantially resisted;
an extension fitted to the pivot ball;
a viewing screen mount perpendicularly and seamlessly affixed to the extension;
means for controlling the power supply.

10. The apparatus according to claim 9 further comprising the inner support affixed proximal to a midpoint of the inner horizontal.

11. The apparatus according to claim 9 wherein rotation gear is removably affixed to the circular member.

12. The apparatus according to claim 10 wherein rotation gear is removably affixed to the circular member.

13. The apparatus according to claim 9 wherein the means for controlling the power supply further comprises a receiver affixed to the power supply;
a remote control in communication with the receiver.

14. The apparatus according to claim 10 wherein the means for controlling the power supply further comprises a receiver affixed to the power supply;
a remote control in communication with the receiver.

15. The apparatus according to claim 11 wherein the means for controlling the power supply further comprises a receiver affixed to the power supply;
a remote control in communication with the receiver.

16. The apparatus according to claim 12 wherein the means for controlling the power supply further comprises a receiver affixed to the power supply;
a remote control in communication with the receiver.

17. A rotational support apparatus for use with a viewing screen, the apparatus comprising, in combination:
a circular wall mount plate with a plurality of spaced apart mount orifices;
a circular inner horizontal seamlessly affixed to the wall mount plate;
a bearing race within an outer surface of the inner horizontal;
an inner support seamlessly affixed to the inner horizontal, the inner support proximal to a midpoint of the inner horizontal, the inner support disposed opposite an approximate midpoint of the inner horizontal bearing race;
a power supply affixed to the inner support;
a drive motor removably affixed to the inner support, the drive motor in communication with the power supply;
a vertically disposed drive gear affixed to the drive motor;
a circular encasement having an inner diameter greater than the outer surface of the inner horizontal;
a bearing race disposed within the inner diameter of the circular encasement;
a plurality of roller bearings disposed within the inner horizontal bearing race and the circular encasement bearing race;
a circular vertical member perpendicularly and seamlessly affixed to outer end of the circular encasement;
a rotation gear removably and vertically affixed to the circular member, the rotation gear in communication with the drive gear;
a conical extrusion seamlessly emanating from the vertical member, the extrusion having an outer surface at an at least 20 degree angle from the vertical member;
a socket within a center of the extrusion;
a pivot ball fitted within the socket;
a pivot material disposed between the pivot ball and the socket, whereby pivot of the pivot ball is resisted;
an extension fitted to the pivot ball;
a viewing screen mount perpendicularly and seamlessly affixed to the ball extension, the viewing screen mount for removable attachment to the viewing screen;
means for controlling the power supply.

18. The apparatus according to claim 17 wherein the means for controlling the power supply further comprises a receiver affixed to the power supply;
a remote control in communication with the receiver.

* * * * *

UNITED STATES PATENT AND TRADEMARK OFFICE
CERTIFICATE OF CORRECTION

| | | |
|---|---|---|
| PATENT NO. | : 7,748,670 B1 | Page 1 of 1 |
| APPLICATION NO. | : 12/029178 | |
| DATED | : July 6, 2010 | |
| INVENTOR(S) | : Steven C. Valdez | |

It is certified that error appears in the above-identified patent and that said Letters Patent is hereby corrected as shown below:

Title Page
Item 76 the inventors name is misspelled and should read as follows:

Steven C. Valdez

Signed and Sealed this

Nineteenth Day of July, 2011

David J. Kappos
*Director of the United States Patent and Trademark Office*